United States Patent
Takamori et al.

(10) Patent No.: US 9,035,585 B2
(45) Date of Patent: May 19, 2015

(54) MOTOR DRIVE CIRCUIT

(71) Applicant: Semiconductor Components Industries, LLC, Phoenix, AZ (US)

(72) Inventors: Yasuyuki Takamori, Gunma-ken (JP); Masashi Muragi, Saitama-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 79 days.

(21) Appl. No.: 13/652,919

(22) Filed: Oct. 16, 2012

(65) Prior Publication Data

US 2013/0141025 A1      Jun. 6, 2013

(30) Foreign Application Priority Data

Oct. 17, 2011   (JP) .................................. 2011-228168

(51) Int. Cl.
*H02H 3/00*   (2006.01)
*H02P 6/00*   (2006.01)
*H02P 6/24*   (2006.01)

(52) U.S. Cl.
CPC ............... *H02H 3/003* (2013.01); *H02P 6/008* (2013.01); *H02P 6/24* (2013.01)

(58) Field of Classification Search
None
See application file for complete search history.

(56) References Cited

U.S. PATENT DOCUMENTS

| | | | | |
|---|---|---|---|---|
| 4,833,376 | A   * | 5/1989  | Shimura      | 318/286 |
| 7,352,160 | B2 * | 4/2008  | Shimizu et al. | 323/282 |
| 8,711,593 | B2 * | 4/2014  | Ho et al.    | 363/126 |
| 2007/0075697 | A1 * | 4/2007 | Shimizu et al. | 323/282 |
| 2008/0080219 | A1 * | 4/2008 | Sohma        | 363/89 |
| 2008/0297959 | A1 * | 12/2008 | Tanabe et al. | 361/33 |
| 2009/0244934 | A1 * | 10/2009 | Wang et al.  | 363/21.06 |

FOREIGN PATENT DOCUMENTS

JP     2002-272162 A     9/2002

* cited by examiner

*Primary Examiner* — Paul Ip
*Assistant Examiner* — Devon Joseph (57) ABSTRACT

A motor-drive circuit includes a detection circuit to detect a reverse current to flow in a direction from a first sink-side transistor to a second source-side transistor or in a direction from a second sink-side transistor to a first source-side transistor, a disable circuit to disable a detection output of the detection circuit during a predetermined time period from a start of detection of the reverse current performed by the detection circuit, a first inhibit circuit to inhibit synchronous rectification according to a detection output of the detection circuit when the predetermined time period has elapsed from a start of detection of the reverse current performed by the detection circuit, and a second inhibit circuit.

17 Claims, 7 Drawing Sheets

MOTOR DRIVE CIRCUIT

CROSS-REFERENCE TO RELATED APPLICATION

This application claims the benefit of priority to Japanese Patent Application No. 2011-228168, filed Oct. 17, 2011, of which full contents are incorporated herein by reference.

BACKGROUND OF THE INVENTION

1. Field of the Invention

The present invention relates to a motor drive circuit.

2. Description of the Related Art

There is generally known a motor drive circuit configured to perform synchronous rectification in an H-bridge circuit that is configured to supply a drive current (see Japanese Laid-Open Patent Publication NO. 2002-272162).

SUMMARY OF THE INVENTION

A motor drive circuit according to an aspect of the present invention is characterized in that when first source-side and second sink-side transistors and second source-side and first sink-side transistors are turned on/off in a complementary manner so as to supply a drive current to a drive coil connected between a first connection point of the first source-side transistor and the first sink-side transistor connected in series and a second connection point of the second source-side transistor and the second sink-side transistor connected in series, the first or the second sink-side transistor is turned on/off according to a PWM signal and synchronous rectification is performed for the motor drive circuit such that the first or the second source-side transistor in an off state is turned on and kept on during a time period during which the first or the second sink-side transistor is off according to the PWM signal, and that the motor drive circuit includes: a detection circuit configured to detect a reverse current to flow in a direction from the first sink-side transistor to the second source-side transistor or in a direction from the second sink-side transistor to the first source-side transistor; a disable circuit configured to disable a detection output of the detection circuit during a predetermined time period from a start of detection of the reverse current performed by the detection circuit; a first inhibit circuit configured to inhibit the synchronous rectification according to a detection output of the detection circuit when the predetermined time period has elapsed from a start of detection of the reverse current performed by the detection circuit; and a second inhibit circuit configured to inhibit the synchronous rectification irrespective of an operation of the first inhibit circuit, when each on-duty period of the PWM signal to turn on the first or the second sink-side transistor is shorter than the predetermined time period.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Embodiments of the present invention will described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. At least the following details will become apparent from descriptions of this specification and of the accompanying drawings.

===Motor Drive Circuit===

Figure 1:
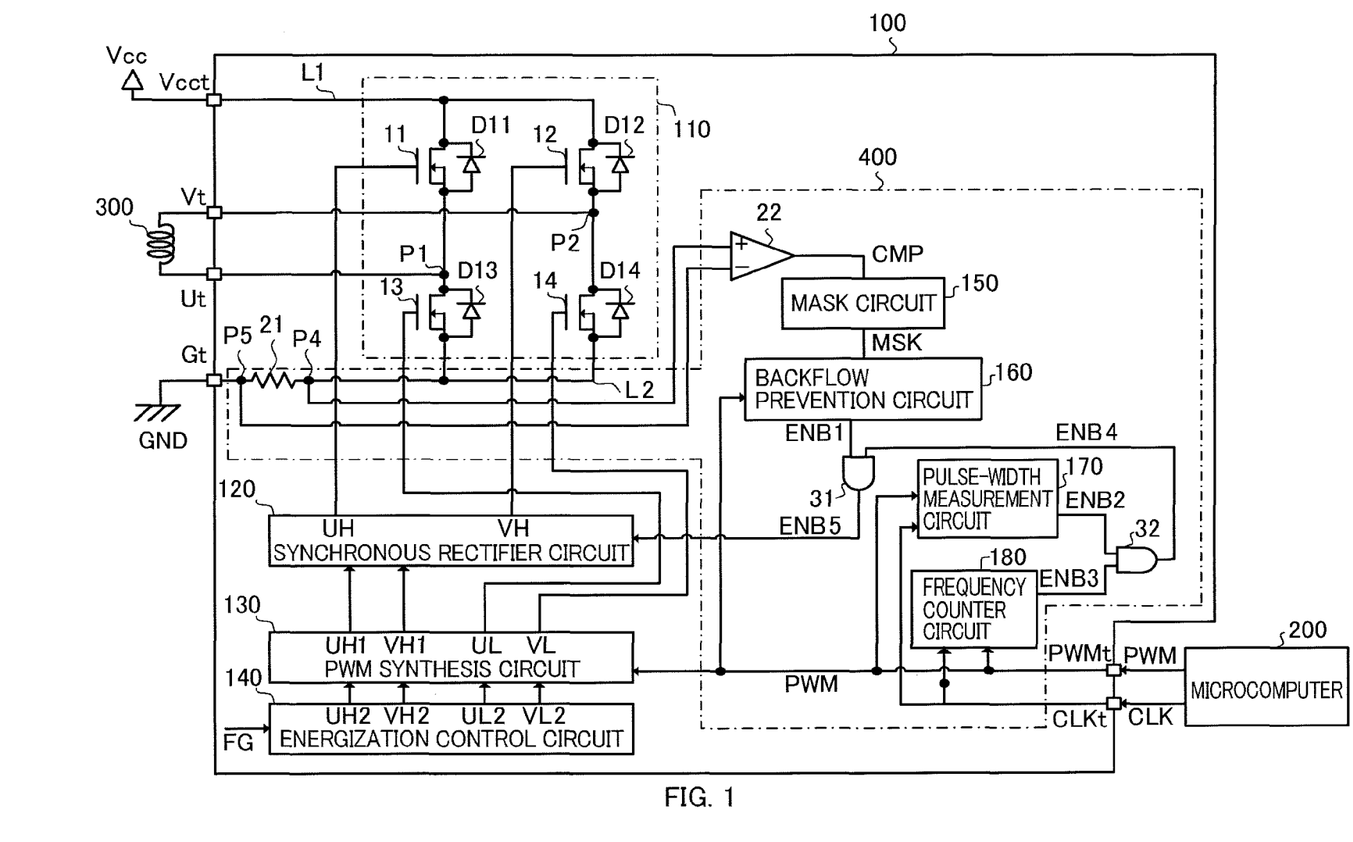
FIG. 1 is a diagram illustrating a motor drive circuit according to an embodiment of the present invention.

FIG. 1 is a diagram illustrating a motor drive circuit according to an embodiment of the present invention.

A motor drive circuit 100 is an integrated circuit, for example, and a circuit configured to drive a single-phase motor (not shown), for example. The motor drive circuit 100 includes: an H-bridge circuit 110; a synchronous rectifier circuit 120; a PWM synthesis circuit 130; an energization control circuit 140; a synchronous rectification control circuit 400; and six terminals, for example, PWMt, CLKt, Vcct, Vt, Ut, and Gt.

The terminal Vcct is applied with a power supply voltage Vcc, and the terminal Gt is grounded. A drive coil 300 is connected between the terminals Vt and Ut. A PWM signal and a clock signal (CLK) are inputted to the terminals PWMt and CLKt, respectively, from a microcomputer 200 provided in an exterior. A PWM signal and a clock signal will be described later in detail.

The H-bridge circuit 110 is a circuit configured to supply a drive current I1 for rotating a single-phase motor to the drive coil 300. The H-bridge circuit 110 will be described later in detail.

The synchronous rectifier circuit 120, the PWM synthesis circuit 130, and the energization control circuit 140 are circuits configured to control the H-bridge circuit 110 based on an FG signal having a frequency corresponding to the number of rotations of the single-phase motor. The synchronous rectifier circuit 120, the PWM synthesis circuit 130, and the energization control circuit 140 will be described later in detail.

The synchronous rectification control circuit 400 is a circuit configured to control inhibition/permission of synchronous rectification that is performed by the synchronous rectifier circuit 120 according to a PWM signal to be inputted to the motor drive circuit 100 and to whether or not a reverse current I4 flows in a direction from a sink power supply line L2 to a source power supply line L1. The synchronous rectification control circuit 400, a PWM signal, a reverse current I4, and synchronous rectification will be described later in detail.

===H-Bridge Circuit===

Hereinafter, a description will be given of the H-bridge circuit according to an embodiment of the present invention, with reference to FIG. 1.

The H-bridge circuit 110 includes four n-type MOSFETs 11 to 14, and parasitic diodes D11 to D14 are formed between the drains and the sources of the n-type MOSFETs 11 to 14, respectively. The n-type MOSFETs 11 and 12 correspond to source-side transistors, and the n-type MOSFETs 13 and 14 correspond to sink-side transistors.

Here, the source power supply line L1 is applied with the power supply voltage Vcc via the terminal Vcct. The sink power supply line L2 is grounded via the sense resistor 21 and the terminal Gt. The sense resistor 21 will be described later in detail.

The n-type MOSFET 11 and the n-type MOSFET 13 are connected in series between the source power supply line L1 and the sink power supply line L2. A connection point P1 between the source of the n-type MOSFET 11 and the drain of the n-type MOSFET 13 is connected to one end of the drive coil 300 via the terminal Ut. The cathodes and the anodes of the parasitic diodes D11 and D13 respectively formed in the n-type MOSFETs 11 and 13 are respectively connected to the drains and the sources of the n-type MOSFETs 11 and 13. The n-type MOSFET 12 and the n-type MOSFET 14 are connected in series between the source power supply line L1 and the sink power supply line L2. A connection point P2 between the source of the n-type MOSFET 12 and the drain of the n-type MOSFET 14 is connected to the other end of the drive coil 300 opposite to the one end thereof, via the terminal Vt. The cathodes and the anodes of the parasitic diodes D12 and D14 respectively formed in the n-type MOSFETs 12 and 14 are respectively connected to the drains and the sources of the n-type MOSFETs 12 and 14.

===Energization Control Circuit 140, PWM Synthesis Circuit 130, Synchronous Rectifier Circuit 120===

Hereinafter, a description will be given of the energization control circuit 140, the PWM synthesis circuit 130, and the synchronous rectifier circuit 120 according to an embodiment of the present invention, with reference to FIG. 1.

An FG signal having a frequency corresponding to the number of rotations of the single-phase motor is inputted to the energization control circuit 140. An FG signal is generated based on an output of a hall device, etc., for example. The energization control circuit 140 is configured to output logic signals UH2, VH2, UL2, and VL2 for respectively controlling the n-type MOSFETs I1 to I4 as to on/off based on an FG signal. When a drive current I1 is supplied to the drive coil 300 in a direction from one end to the other end of the drive coil 300, the energization control circuit 140 outputs high-level logic signals UH2 and VL2 and low-level logic signals VH2 and UL2. When a drive current (hereinafter, referred to as a "drive current I1'") is supplied to the drive coil 300 in a direction from the other end to the one end of the drive coil 300, the energization control circuit 140 outputs high-level logic signals VH2 and UL2 and low-level logic signals UH2 and VL2. When no drive current I1 or I1' is supplied to the drive coil 300, the energization control circuit 140 outputs low-level logic signals UH2, UL2, VH2, and VL2. It is assumed, for example, that high-level logic signals UH2, VH2, UL2, and VL2 are logic signals for turning on the n-type MOSFETs 11 to 14, respectively, and low-level logic signals UH2, VH2, UL2, and VL2 are logic signals for turning off the n-type MOSFETs 11 to 14, respectively.

The PWM synthesis circuit 130 synthesizes a PWM signal with each of logic signals UL2 and VL2 among logic signals UH2, UL2, VH2, and VL2 outputted from the energization control circuit 140, and outputs control signals UL and VL. For example, when a drive current I1 is supplied to the drive coil 300, logic signals UL2 and VL2 go low and high, respectively, as described above. The PWM synthesis circuit 130 performs logical multiplication of a PWM signal and each of logic signals UL2 and VL2, and generates control signals UL and VL. That is, the PWM synthesis circuit 130 outputs a low-level control signal UL and such a control signal VL that a low-level PWM signal appears intermittently in a high level period thereof. For example, when a drive current I1' is supplied to the drive coil 300, logic signals UL2 and VL2 go high and low, respectively, as described above. The PWM synthesis circuit 130 performs logical multiplication of a PWM signal and each of logic signals UL2 and VL2, and generates control signals UL and VL. That is, the PWM synthesis circuit 130 outputs a low-level control signal VL and such a control signal UL that a low-level PWM signal appears intermittently in a high level period thereof. Generating a control signal based on the logical multiplication of each of logic signals UL2 and VL2 and a PWM signal is referred to as synthesizing each of logic signals UL2 and VL2 with a PWM signal. The PWM synthesis circuit 130 outputs logic signals UH1 and VH1, which are similar to logic signals UH2 and VH2 among logic signals UH2, UL2, VH2, and VL2 outputted from the energization control circuit 140. Here, a PWM signal is a logic signal for controlling the rotation speed of a motor and set at on-duty proportional to the rotation speed of the single-phase motor. The on-duty will be described later in detail. When a drive current I1 is supplied to the drive coil 300, the n-type MOSFET 14 is on during a time period during which a PWM signal is high, and the n-type MOSFET 14 is off during a time period during which a PWM signal is low. When a drive current I1' is supplied to the drive coil 300, the n-type MOSFET 13 is on during a time period during which a PWM signal is high, and the n-type MOSFET 13 is off during a time period during which a PWM signal is low. The on-duty of a PWM signal indicates the ratio of a pulse width to one period of a PWM signal, such as the ratio of on-time to a switching period (on-time+off-time) in the n-type MOSFET 13 and 14. On-time (a time period during which a PWM signal is high, for example) is referred to as an on-duty period, while off-time (a time period during which a PWM signal is low, for example) is referred to as an off-duty period. When rotating the motor at the maximum rotation speed, on-duty is set at 100%, for example. When stopping the motor, on-duty is set at 0%, for example. When rotating the motor at a half the maximum rotation speed, on-duty is set at 50%, for example.

The synchronous rectifier circuit 120 converts a waveform of an output from the PWM synthesis circuit 130 into a waveform for performing synchronous rectification, and outputs a result, for example. Logic signals UH1 and VH1 outputted from the PWM synthesis circuit 130 and a fifth enable signal ENB5 of the synchronous rectification control circuit 400 are inputted to the synchronous rectifier circuit 120, for example. Synchronous rectification and a fifth enable signal ENB5 will be described later in detail. For example, the synchronous rectifier circuit 120 applies control signals UH and VH having waveforms for performing synchronous rectification respectively converted from those of logic signals UH1 and VH1, to the gates of the n-type MOSFETs 11 and 12, respectively.

===Synchronous Rectification and Backflow Phenomenon===

Figure 2:
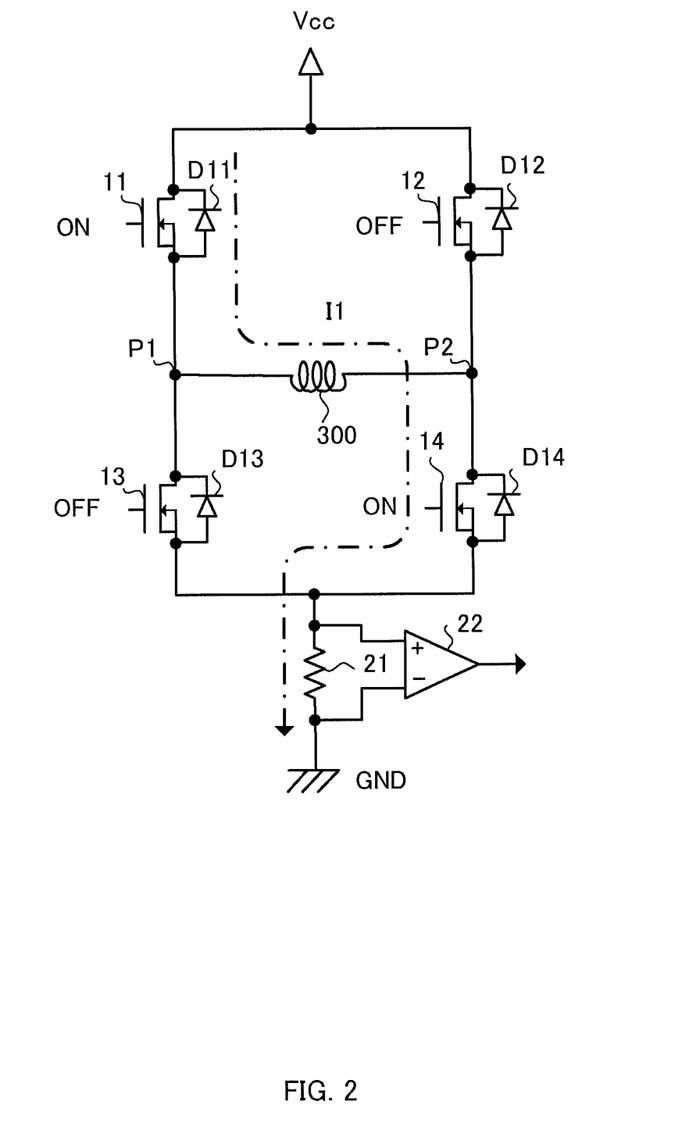
FIG. 2 is a circuit diagram for describing a drive current.
Figure 3:
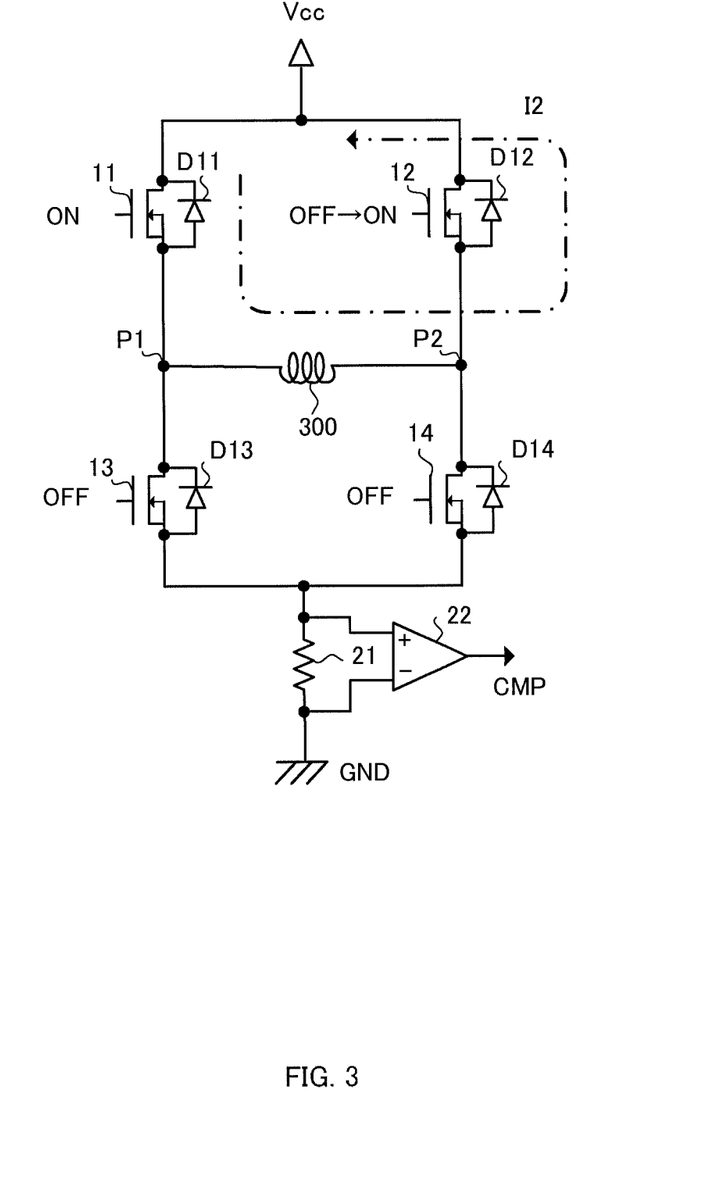
FIG. 3 is a circuit diagram for describing a regenerative current.
Figure 4:
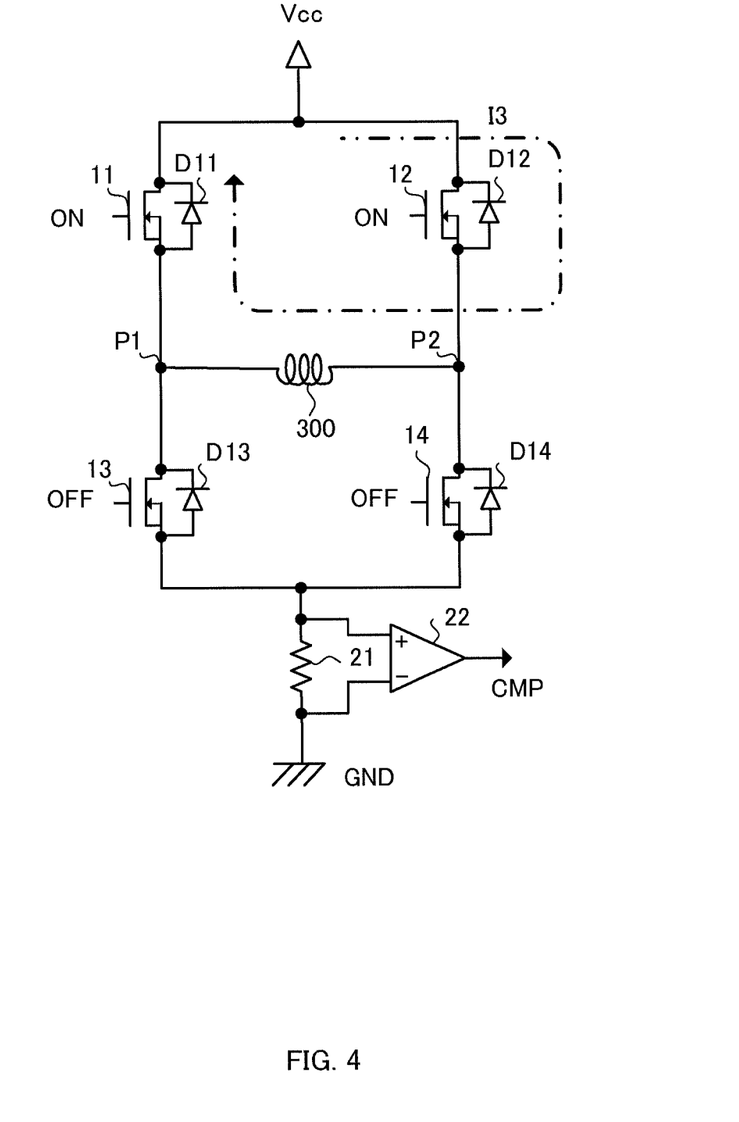
FIG. 4 is a circuit diagram for describing a brake current.
Figure 5:
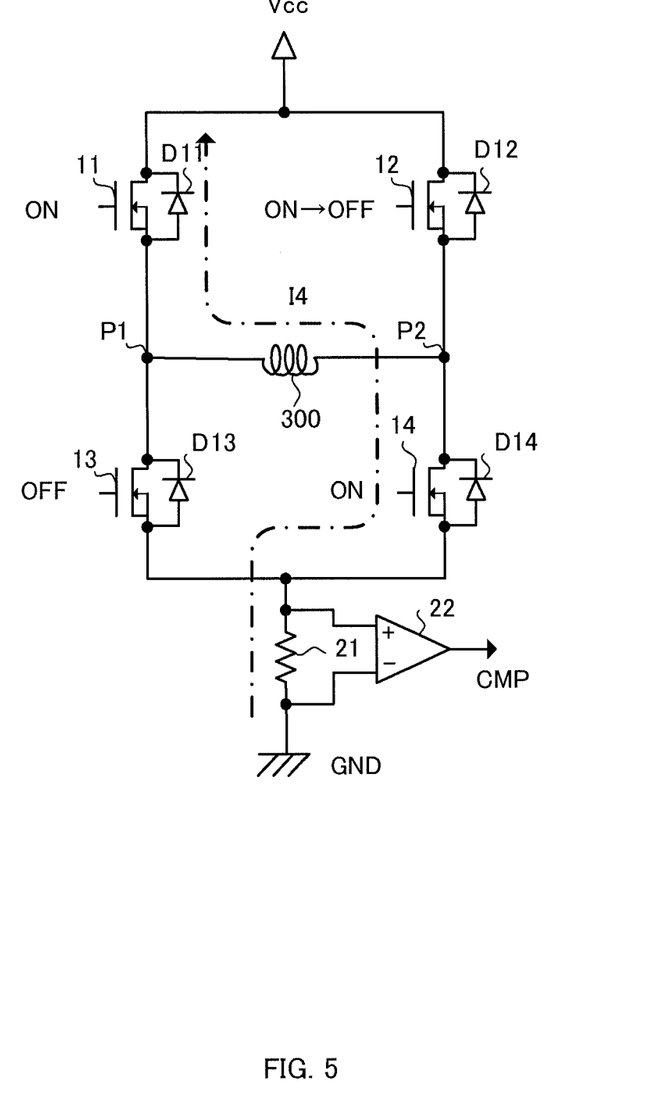
FIG. 5 is a circuit diagram for describing a reverse current.

Hereinafter, a description will be given of synchronous rectification and backflow phenomenon according to an embodiment of the present invention, with reference to FIG. 2 to FIG. 5. FIG. 2 is a circuit diagram for describing a drive current. FIG. 3 is a circuit diagram for describing a regenerative current. FIG. 4 is a circuit diagram for describing a brake current. FIG. 5 is a circuit diagram for describing a reverse current. FIG. 2 to FIG. 5 are circuit diagrams illustrated by picking up the H-bridge circuit 110, the sense resistor 21, a comparison circuit 22, and the drive coil 300 in FIG. 1, for convenience of explanation, and other components are omitted.

For example, a description will be given of synchronous rectification and backflow phenomenon when a drive current I1 is supplied to the drive coil 300.

<Synchronous Rectification>

Synchronous rectification is a method for controlling a motor drive circuit that is used when reducing heat generation and power consumption in driving a motor, for example.

For example, when the n-type MOSFETs 11 to 14 are on, off, off, and on (hereinafter, referred to as a "first state"), a drive current I1 flows in order of a power supply, a drain-source path of the n-type MOSFET 11, the connection point P1, the drive coil 300, the connection point P2, a drain-source path of the n-type MOSFET 14, the sense resistor 21, and a ground GND. Thereafter, for example, when the n-type MOSFET 14 in an on state is turned off according to the off-duty of a PWM signal, the drive coil 300 tries to maintain a drive current I1 flowing from one end of the drive coil 300 to the other end thereof in the case of the first state. Thus, a regenerative current I2 flows in order of the drain-source path of the n-type MOSFET 11, the connection point P1, the drive coil 300, the connection point P2, the parasitic diode D12, and the drain-source path of the n-type MOSFET 11. In this case, power consumption is increased due to a regenerative current I2 and forward bias of the parasitic diode D12. Thus, when the n-type MOSFET 14 in an on state is turned off according to a PWM signal, the n-type MOSFET 12 in an off state is turned on, thereby passing a regenerative current I2 to a drain-source path of the n-type MOSFET 12 with on-resistance lower than forward resistance of the parasitic diode D12, and thus heat generation and power consumption can be reduced. As such, a control method for reducing heat generation and power consumption by turning on the n-type MOSFET 12 in an off state connected in series with the n-type MOSFET 14 when the n-type MOSFET 14 in an on state is turned off according to a PWM signal, indicates synchronous rectification.

<Backflow Phenomenon>

Backflow phenomenon is a phenomenon in which a reverse current I4 flows from the ground GND toward the power supply when synchronous rectification is performed, for example. That is, a phenomenon in which a reverse current I4 flows from the sink-side power-supply line L2 to the source-side power-supply line I1.

For example, in the case of the first state, a drive current T1 flows, as described above. Thereafter, for example, when the n-type MOSFET 14 is turned off according to a PWM signal and synchronous rectification is performed, a regenerative current I2 flows, as described above. In this case, a coil voltage is generated in the drive coil 300, and a brake current I3 flows in a direction in which the coil voltage is canceled. A brake current I3 flows in order of the drain-source path of the n-type MOSFET 12, the connection point P2, the drive coil 300, the connection point P1, the drain-source path of the n-type MOSFET 11, the drain-source path of the n-type MOSFET 12. Since this brake current I3 is supplied to the drive coil 300 in a direction opposite to that of a drive current I1, the rotation speed of the motor is reduced. Thereafter, for example, when the n-type MOSFET 12 in an on state is turned off, the drive coil 300 tries to maintain a brake current flowing from the other end toward the one end of the drive coil 300. Thus, a reverse current I4 flows in a direction from the ground GND, the sense resistor 21, the parasitic diode D14, the connection point P2, the drive coil 300, the connection point P1, the drain-source path of the n-type MOSFET 11, and the power supply.

For example, when a drive current I1' is supplied to the drive coil 300, the n-type MOSFETs 11 to 14 are off, on, on, and off, respectively (hereinafter, referred to as a "second state"). The n-type MOSFET 13 is turned on/off according to a PWM signal. When the n-type MOSFET 13 in an on state is turned off according to a PWM signal and synchronous rectification is performed, a regenerative current (hereinafter, referred to as a "regenerative current I2'") flows in a direction opposite to that of a regenerative current I2. In this case, a coil voltage is generated in the drive coil 300, and a brake current (hereinafter, referred to as a "brake current I3'") flows in a direction (a direction opposite to that in which a regenerative current I2' flows) in which a coil voltage is cancelled. Thereafter, for example, when the n-type MOSFET 11 in an on state is turned off, the drive coil 300 tries to maintain a brake current I3' flowing from the one end toward the other end of the drive coil 300. Thus, a reverse current (hereinafter, referred to as a "reverse current I4'") flows in a direction from the ground GND, the sense resistor 21, the parasitic diode D13, the connection point P1, the drive coil 300, the connection point P2, the drain-source path of the n-type MOSFET 12, and the power supply. A phenomenon in which a reverse current I4 or I4' flows indicates a backflow phenomenon.

===Synchronous Rectification Control Circuit===

Hereinafter, a description will be given of the synchronous rectification control circuit according to an embodiment of the present invention, with reference to FIG. 1.

The synchronous rectification control circuit 400 includes: the sense resistor 21; the comparison circuit 22; a mask circuit 150 (disable circuit); a backflow prevention circuit 160 (first inhibit circuit); the pulse-width measurement circuit 170 (second inhibit circuit); the frequency counter circuit 180 (third inhibit circuit); and AND circuits 31 and 32. The sense resistor 21 and the comparison circuit 22 are equivalent to a detection circuit.

The sense resistor 21 is a shunt resistor, for example, to detect a current flowing through the H-bridge circuit 110. The sense resistor 21 is connected to the sink power supply line L2 on the side closer to the terminal Gt than the connection point between the sources of the n-type MOSFETs 13 and 14. An end portion of the sense resistor 21 on the terminal Gt side is given as a one end P5, and an end portion the sense resistor 21 on the side opposite to the one end P5 is given as the other end P4.

The comparison circuit 22 is configured to compare potentials at the one end P5 and the other end P4 of the sense resistor 21, and output a comparison signal CMP indicative of such a comparison result. A non-inverting input terminal of the comparison circuit 22 is connected to the other end P4 of the sense resistor 21. An inverting input terminal of the comparison circuit 22 is connected to the one end P5 of the sense resistor 21. When the potential at the other end P4 is higher than the potential at the one end P5, the comparison circuit 22 outputs a high-level comparison signal CMP. Whereas, when the potential at the other end P4 is lower than the potential at the one end P5, the comparison circuit 22 outputs a low-level comparison signal CMP.

The mask circuit 150 is an analog filter circuit, for example, configured to mask a comparison signal CMP during a first time period (a predetermined time period) (e.g., 1.5 microsecond) from a time when a comparison signal CMP is changed from a high level to a low level, and output a mask signal MSK. Here, masking a comparison signal CMP indicates inhibiting using a comparison signal CMP in the subsequent stage, for example. A comparison signal CMP is inputted to the mask circuit 150. For example, when a comparison signal CMP goes high, the mask circuit 150 does not perform masking and outputs a high-level mask signal MSK. Whereas, for example, when a comparison signal CMP goes low, the mask circuit 150 outputs a mask signal MSK that is high so as to mask the comparison signal, during the first time period from a time when the comparison signal CMP goes low. that is, the mask circuit 150 outputs a high-level mask signal MSK until a time when the first time period has elapsed from a time when a comparison signal CMP goes low, and after the first period has elapsed from a time when a comparison signal CMP goes low, the mask circuit 150 outputs a mask signal MSK of the same logic level as that of a comparison signal CMP inputted to the mask circuit 150.

The backflow prevention circuit 160 is a circuit configured to control permission/inhibition of synchronous rectification performed by the synchronous rectifier circuit 120 based on a mask signal MSK. A mask signal MSK and a PWM signal is inputted to the backflow prevention circuit 160, and the backflow prevention circuit 160 outputs a first enable signal ENB1. For example, when a high-level mask signal MSK is inputted to the backflow prevention circuit 160, the backflow prevention circuit 160 outputs a high-level first enable signal ENB1 for permitting synchronous rectification, irrespective of the logic level of a PWM signal. Whereas, for example, when a low-level mask signal MSK is inputted to the backflow prevention circuit 160, the backflow prevention circuit 160 outputs a low-level first enable signal ENB1 for inhibiting synchronous rectification during a time period equivalent to substantially two periods of a PWM signal, for example, after a low-level mask signal MSK is inputted to the backflow prevention circuit 160, and thereafter the backflow prevention circuit 160 outputs a high-level first enable signal ENB1. After a mask signal MSK goes low from high, the backflow prevention circuit 160 measures a time period in which a low-level first enable signal ENB1 is outputted, by counting such falling edges that PWM signals inputted to the backflow prevention circuit 160 change in logic level from a high level to a low level. The time period equivalent to substantially two periods of a PWM signal is a time period from a time when a low level mask signal MSK is inputted to the backflow prevention circuit 160 until a time when the backflow prevention circuit 160 counts e.g., three falling edges of the PWM signal, for example.

The pulse-width measurement circuit 170 is configured to output a second enable signal ENB2 for controlling permission/inhibition of synchronous rectification performed by the synchronous rectifier circuit 120 based on the on-duty period of a PWM signal inputted to the motor drive circuit 100. A PWM signal and a clock signal are inputted to the pulse-width measurement circuit 170. A clock signal is a signal, having a frequency sufficiently higher than the frequency of a PWM signal, for measuring the on-duty period of a PWM signal, for example. The pulse-width measurement circuit 170 detects such a rising edge that a PWM signal changes in logic level from a low level to a high level, and then outputs a second enable signal ENB2 based on a time period until a time when a falling edge that is immediately after the rising edge is detected, for example. A time period from a time when a rising edge of the above described PWM signal is detected until a time when the subsequent falling edge thereof is detected corresponds to the on-duty period of a PWM signal.

For example, when the pulse-width measurement circuit 170 detects a rising edge of a PWM signal, the pulse-width measurement circuit 170 outputs a low-level second enable signal ENB2. For example, if the pulse-width measurement circuit 170 does not detect a falling edge of a PWM signal within the first time period from detection of a rising edge of a PWM signal (hereinafter, referred to as "the on-duty period is longer than the first time period"), the pulse-width measurement circuit 170 outputs a high-level second enable signal ENB2 when a second time period has elapsed from the detection of the rising edge of the PWM signal performed by the pulse-width measurement circuit 170. That is, when the on-duty period is longer than the first time period, the pulse-width measurement circuit 170 outputs high-level second enable signal ENB2. Whereas, for example, when the pulse-width measurement circuit 170 detects a falling edge of a PWM signal within the first time period from detection of a rising edge of a PWM signal (hereinafter, referred to as "the on-duty period is shorter than the first time period"), the pulse-width measurement circuit 170 continues to output a low-level second enable signal ENB2 even after the second time period has elapsed from the detection of the rising edge of the PWM signal performed by the pulse-width measurement circuit 170. That is, when the on-duty period is shorter than the first time period, the pulse-width measurement circuit 170 outputs a low-level second enable signal ENB2. In this case, it is assumed that the pulse-width measurement circuit 170 continues to output a low-level second enable signal ENB2 until when a PWM signal having an on-duty period longer than the second time period is detected. Thereafter, for example, if a PWM signal having an on-duty period longer than the second time period is detected, it is assumed that the pulse-width measurement circuit 170 outputs a high-level second enable signal ENB2.

The frequency counter circuit 180 is configured to output a third enable signal ENB3 for controlling permission/inhibition of synchronous rectification performed by the synchronous rectifier circuit 120, based on a frequency of a PWM signal inputted to the motor drive circuit 100. A PWM signal and a clock signal are inputted to the frequency counter circuit 180. The frequency counter circuit 180 outputs a third enable signal ENB3 based on a time period from detection of a rising edge of a PWM signal until detection of the subsequent rising edge of the PWM signal, for example. A time period from detection of a rising edge of a PWM signal until detection of the subsequent rising edge thereof as described above corresponds to a period of a PWM signal, and the reciprocal of a period of a PWM signal corresponds to a frequency of a PWM signal.

For example, when a PWM signal has a frequency lower than the predetermined frequency (i.e., 10 kilohertz), the frequency counter circuit 180 outputs a low-level third enable signal ENB3 for inhibiting synchronous rectification. Whereas, for example, when a PWM signal has a frequency higher than the predetermined frequency, the frequency counter circuit 180 outputs a high-level third enable signal ENB3 for permitting synchronous rectification. The predetermined frequency will be described later in detail.

A second enable signal ENB2 outputted from the pulse-width measurement circuit 170 and a third enable signal ENB3 outputted from the frequency counter circuit 180 are inputted to the AND circuit 32, and a fourth enable signal ENB4 is outputted therefrom. A first enable signal ENB1 outputted from the backflow prevention circuit 160 and a fourth enable signal ENB4 outputted from the AND circuit 32 are inputted to the AND circuit 31, and a fifth enable signal ENB5 is outputted therefrom. For example, when all of first to third enable signals ENB1, ENB2, and ENB3 are high, a fifth enable signal ENB5 goes high. For example, when any enable signal of first to third enable signals ENB1, ENB2, and ENB3 is low, a fifth enable signal ENB5 goes low.

Here, it is assumed, for example, that when a high-level fifth enable signal ENB5 is inputted to the synchronous rectifier circuit 120, the synchronous rectifier circuit 120 performs synchronous rectification. Whereas, it is assumed, for example, that when a low-level fifth enable signal ENB5 is inputted to the synchronous rectifier circuit 120, the synchronous rectifier circuit 120 does not perform synchronous rectification. Thus, for example, when all of first to third enable signals ENB1, ENB2, and ENB3 are high, synchronous rectification of the synchronous rectifier circuit 120 is in a permitted state. For example, any enable signal of first to third enable signals ENB1, ENB2, and ENB3, is low, synchronous rectification of the synchronous rectifier circuit 120 is in an inhibited state.

===Predetermined Frequency===

Hereinafter, a description will be given of the predetermined frequency used in the frequency counter circuit 180 according to an embodiment of the present invention, with reference to FIG. 1 to FIG. 4.

For example, in the first state, a drive current I1 flows, as described above. Thereafter, for example, when the n-type MOSFET 14 in an on state is turned off according to an off-duty of a PWM signal and synchronous rectification is performed, a regenerative current I2 flows from one end of the drive coil 300 toward the other end thereof, as described above. Thereafter, a coil voltage is generated in the drive coil 300, and a brake current I3 flows from the other end of the drive coil 300 toward the one end thereof so as to cancel the coil voltage. Here, the predetermined frequency is assumed to be the reciprocal of a time period T100 from a time when synchronous rectification is started until a time when a brake current I3 flows, for example. A time period from a time when synchronous rectification is started to a time when a brake current I3 flows is a time period corresponding to "such a period that a direction of a current supplied to the drive coil is changed to a direction opposite to that when synchronous rectification is started". A time period shorter than that from a time when synchronous rectification is started to a time when a brake current I3 flows is a time period corresponding to "such a period that a direction of a current supplied to the drive coil is not changed from a direction when synchronous rectification is started".

For example, when a frequency of a PWM signal is set at a frequency lower than the predetermined frequency, a regenerative current I2 is attenuated and such a state is brought about that a brake current I3 is generated that flows in a direction opposite to that of a regenerative current I2. On the other hand, for example, when a frequency of a PWM signal is set at a frequency higher than the predetermined frequency, synchronous rectification is stopped before a regenerative current I2 is attenuated. Thus, for example, when a frequency of a PWM signal is set at a frequency higher than the predetermined frequency, such a state is brought about that no brake current I3 is generated.

===Operation of Motor Drive Circuit===

Figure 6:
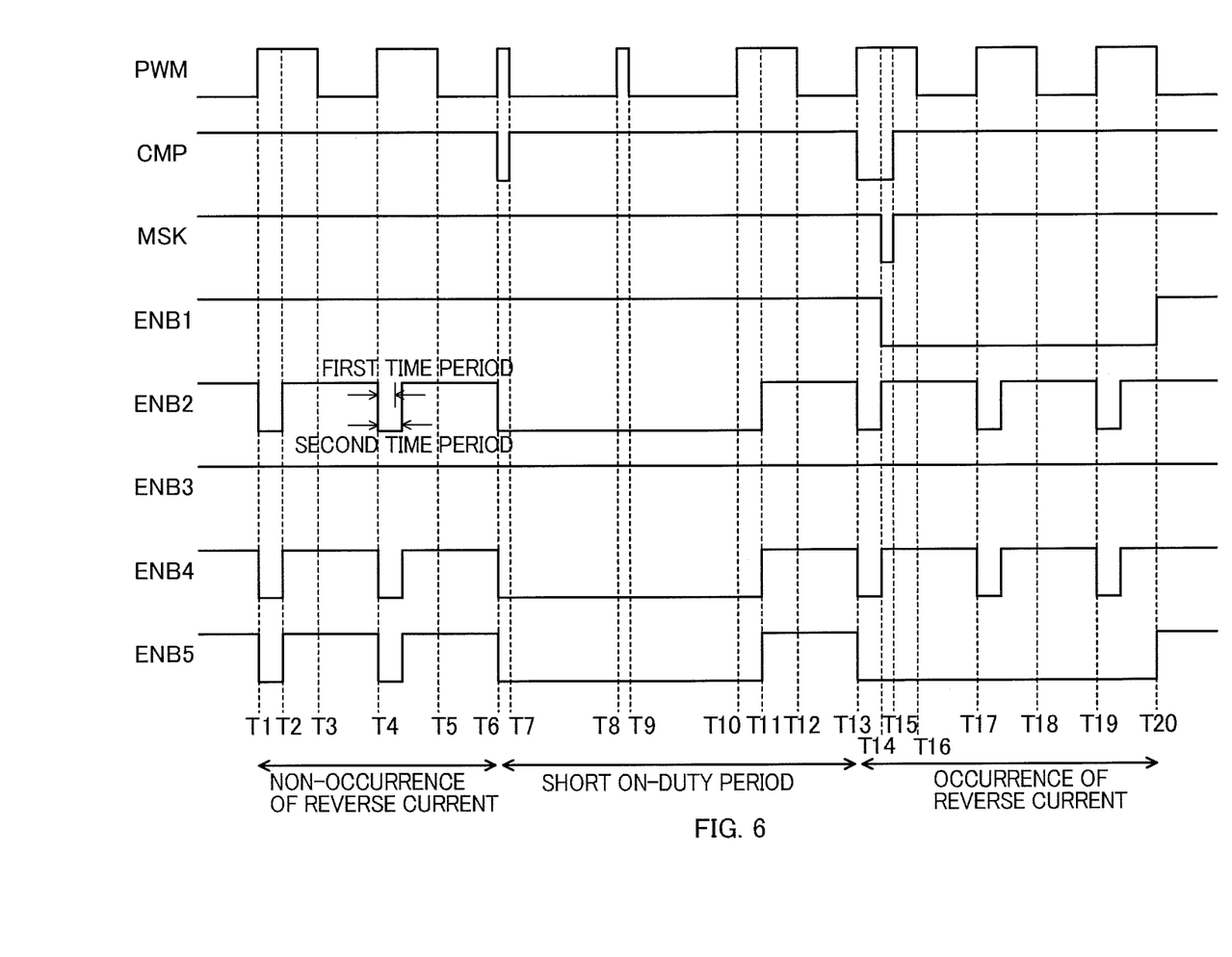
FIG. 6 is a waveform diagram illustrating a signal of a motor drive circuit when an on-duty period of a PWM signal according to an embodiment of the present invention is reduced.
Figure 7:
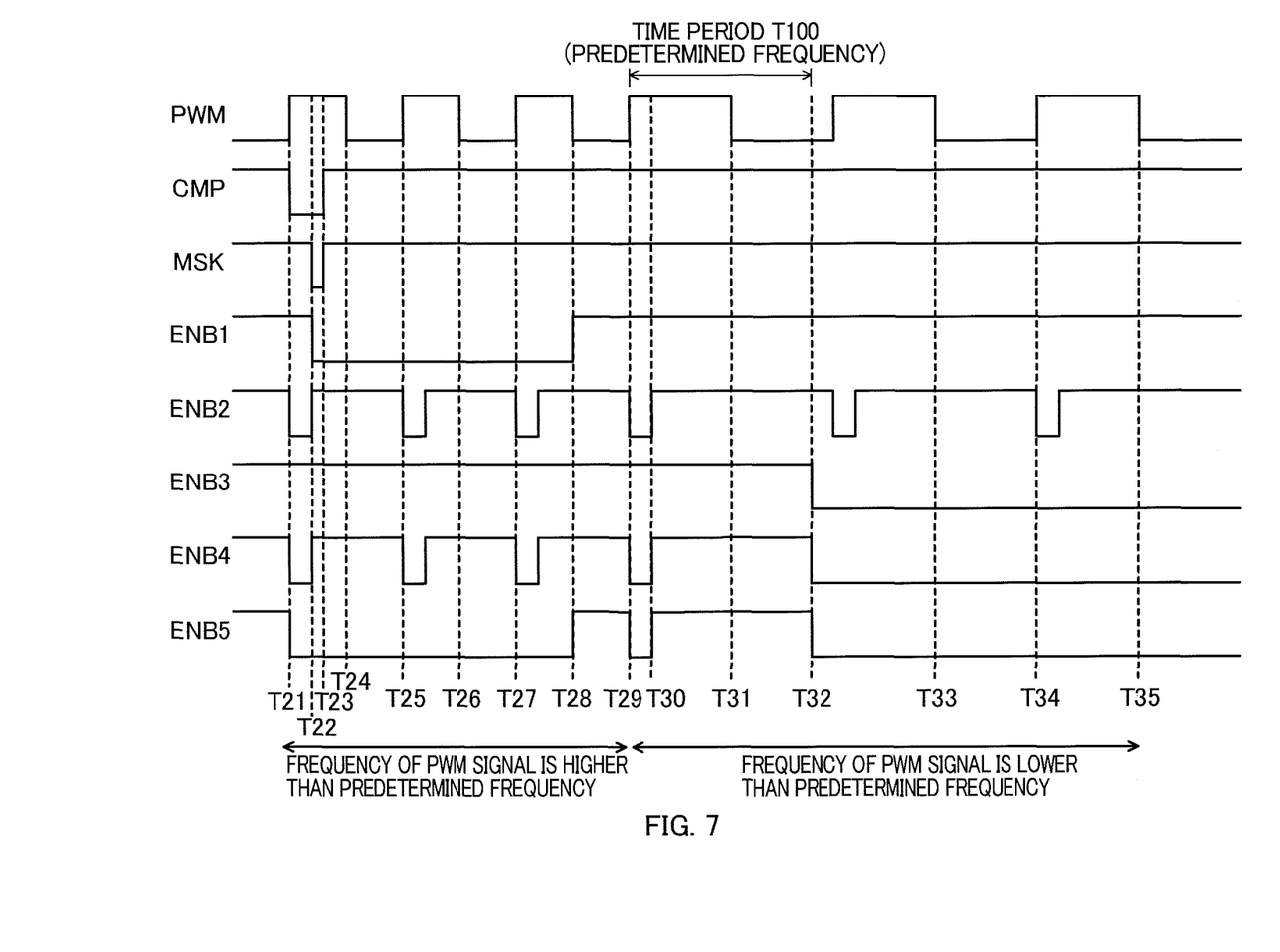
FIG. 7 is a waveform diagram illustrating a signal of a motor drive circuit when a frequency of a PWM signal is lowered.

Hereinafter, a description will be given of an operation of the motor drive circuit according to an embodiment of the present invention, with reference to FIG. 1 to FIG. 7. FIG. 6 is a waveform diagram illustrating a signal of the motor drive circuit when the on-duty period of a PWM signal according to an embodiment of the present invention is reduced. FIG. 7 is a waveform diagram illustrating a signal of the motor drive circuit when a frequency of a PWM signal according to an embodiment of the present invention is lowered.

A description will be given, separately, in the case where the on-duty period of a PWM signal is reduced and the case where a frequency of a PWM signal is lowered, for example. An operation of the motor drive circuit 100 when a drive current I1 is supplied to the drive coil 300 in a direction from one end of the drive coil 300 toward the other end thereof is similar to an operation of the motor drive circuit 100 when a drive current I1' is supplied thereto in a direction from the other end of the drive coil 300 toward the one end thereof, and thus, a description will be given of the operation of the motor drive circuit 100 when a drive current I1 is supplied to the drive coil 300 in the direction from the one end of the drive coil 300 to the other end thereof, and a description of the operation of the motor drive circuit 100 when a drive current I1' is supplied thereto in the direction from the other end of the drive coil 300 toward the one end thereof will be omitted.

For example, a description will be given of an operation when the n-type MOSFETs 11 to 13 are on, off, and off, respectively, and the n-type MOSFET 14 is turned on/off according to a PWM signal.

<In the Case where on-Duty Period of PWM Signal is Reduced>

For example, a description will be given, separately, in the case where no reverse current I4 occurs while the on-duty period of a PWM signal is being reduced (from time T1 to time T6), the case where the on-duty period is short (from time T6 to time T13), and the case where a reverse current I4 occurs (from time T13 to time T20). It is assumed that a frequency of a PWM signal in the case where the on-duty period is reduced is higher than the predetermined frequency, and that the frequency counter circuit 180 continues to output a high-level third enable signal ENB3.

(1) In the Case where No Reverse Current I4 Occurs (from Time T1 to Time T6)

For example, when a PWM signal is changed from a low level to a high level and the n-type MOSFET 14 is turned on (time T1), if no reverse current I4 is detected, the comparison circuit 22 outputs a high-level comparison signal CMP. At this time, the mask circuit 150 and the backflow prevention circuit 160 output a high-level mask signal MSK and a high-level first enable signal ENE1, respectively. The pulse-width measurement circuit 170 outputs a low-level second enable signal ENB2 during the second time period (a time period from time T1 to time T2), and thereafter outputs a high-level second enable signal ENB2. A fourth enable signal ENB4 and a fifth enable signal ENB5 are changed into signals of the same logic level as that of a second enable signal ENB2. Thus, for example, in time periods from time T3 to time t4 and from time T5 to time T6 in which a PWM signal is low and the n-type MOSFET is off, a fifth enable signal ENB5 is high, thereby permitting synchronous rectification of the synchronous rectifier circuit 120. Since the operation of synchronous rectification performed by the synchronous rectifier circuit 120 has been described above, a description thereof is omitted.

(2) In the Case where the on-Duty Period is Short (from Time T6 to Time T13)

For example, when a PWM signal is changed from a low level to a high level and the n-type MOSFET 14 is turned on (time T6), if a reverse current I4 is detected, the comparison circuit 22 outputs a low-level comparison signal CMP. It is assumed that the on-duty period of a PWM signal at this time (from time T6 to time t7) is shorter than the first time period and the second time period. As described above, in the case where a brake current I3 is generated immediately before a PWM signal is changed from a low level to a high level and the n-type MOSFET 14 in an off state is turned on, irrespective of the length of the on-duty period of a PWM signal, when a PWM signal is changed from a low level to a high level, the n-type MOSFET 14 is turned on, and the n-type MOSFET 12 in an on state is turned off, a reverse current I4 occurs. For example, since a brake current I3 has been generated in a time period from time T5 to time T6, when a PWM signal is changed from a low level to a high level at time T6, a reverse current I4 is assumed to occur. The comparison circuit 22 outputs a low-level comparison signal CMP during a time period from time T6 to time t7. Since the mask circuit 150 masks a low-level comparison signal CMP during the first time period, the mask circuit 150 continue to output a high-level mask signal MSK. The backflow prevention circuit 160 outputs a high-level first enable signal ENB1. The pulse-width measurement circuit 170 outputs a low-level second enable signal ENB2 from when a rising edge of a PWM signal is detected (time T6). Since the on-duty period of a PWM signal detected by the pulse-width measurement circuit 170 is shorter than the first time period, the pulse-width measurement circuit 170 continues to output a low-level second enable signal ENB2 until time T11 when a PWM signal with the on-duty period thereof longer than the second time period is detected. Thereafter, the pulse-width measurement circuit 170 outputs a high-level second enable signal ENB2 (from time T11 to time T13). A fourth enable signal ENB4 and a fifth enable signal ENB5 are changed into signals of the same logic level as that of a second enable signal ENB2. Thus, for example, in time periods from time t7 to time t8 and from time t9 to time T10 in which a PWM signal is low and the n-type MOSFET 14 is off, a fifth enable signal ENB5 is low, thereby inhibiting synchronous rectification of the synchronous rectifier circuit 120. For example, in a time period from time T12 to time T13 in which a PWM signal is low and the n-type MOSFET 14 is off, a fifth enable signal ENB5 is high, thereby permitting synchronous rectification of the synchronous rectifier circuit 120.

(3) In the Case where a Reverse Current I4 Occurs (from Time T13 to Time T20)

For example, when a PWM signal is changed from a low level to a high level, the n-type MOSFET 14 is turned on, and the n-type MOSFET 12 in an on state is turned off (time T13), if a reverse current I4 is detected, the comparison circuit 22 outputs a low-level comparison signal CMP. It is assumed that a reverse current I4 is detected in a time period (from time T13 to time T15) longer than the first time period and the second time period, for example. The comparison circuit 22 outputs a low-level comparison signal CMP during a time period from time T13 to time T15. The mask circuit 150 masks a low-level comparison signal CMP during the first time period (from time T13 to time T14) and outputs a high-level mask signal MSK during a time period from time T13 to time T14, and thereafter outputs a low-level mask signal MSK during a time period from time T14 to time T15. The backflow prevention circuit 160 outputs a low-level first enable signal ENB1 during a time period (from time T14 to T20) equivalent to substantially two periods of a PWM signal, for example, elapsed from when a low-level mask signal MSK is outputted (time T14). The pulse-width measurement circuit 170 outputs the same second enable signal ENB2 as that in the case where no reverse current I4 occurs (from time T1 to time T6). A fourth enable signal ENB4 is changed into a signal of the same logic level as that of a second enable signal ENB2. A fifth enable signal ENB5 is changed into a signal of the same logic level as that of a first enable signal ENB1. Thus, for example, in time periods from time T16 to time T17 and from time T18 to time T19 in which a PWM signal is low and the n-type MOSFET 14 is off, a fifth enable signal ENB5 is low, thereby inhibiting synchronous rectification of the synchronous rectifier circuit 120.

<In the Case where a Frequency of a PWM Signal is Lowered>

It is assumed, for example, that a frequency of a PWM signal is higher than the predetermined frequency in a time period from time T21 to time T29, and a frequency of a PWM signal is lower than the predetermined frequency in a time period from time T29 to time T35. For example, in the case where a frequency of a PWM signal is lowered, a description will be given, separately, in the case where a frequency of a PWM signal is higher than the predetermined frequency (from time T21 to time T29) and the case where a PWM signal is lower than the predetermined frequency (from time T29 to time T35). It is assumed that the on-duty period of a PWM signal in the case where a frequency of a PWM signal is lowered is longer than the first time period, and that the pulse-width measurement circuit 17 outputs the same second enable signal ENB2 as that in the case where no reverse current I4 occurs (from time T1 to time T6).

(1) In the Case where a Frequency of a PWM Signal is Higher than the Predetermined Frequency (from Time T21 to Time T29)

For example, when a PWM signal is changed from a low level to a high level and the n-type MOSFET 14 is turned on (time T21), if a reverse current I4 is detected, the comparison circuit 22 outputs a low-level comparison signal CMP. It is assumed that a reverse current I4 is detected in a time period (from time T21 to time T23) longer than the first time period and the second time period, for example. The comparison circuit 22 outputs a low-level comparison signal CMP during a time period from time T21 to time T23. The mask circuit 150 masks a low-level comparison signal CMP during the first time period (from time T21 to time T22) and outputs a high-level mask signal MSK during a time period from time T21 to time T22, and thereafter outputs a low-level mask signal MSK during a time period from time T22 to time T23. The backflow prevention circuit 160 outputs a low-level first enable signal ENB1 during a time period (from time T22 to time T28) equivalent to substantially two periods of a PWM signal, for example, from output of a low-level mask signal MSK (time T22), and thereafter outputs a high-level first enable signal ENB1. As described above, in a time period from time T21 to time T29, a frequency of a PWM signal is higher than the predetermined frequency, and thus the frequency counter circuit 180 outputs a high-level third enable signal ENB3 during a time period from time T21 to time T29. A fourth enable signal ENB4 is changed into a signal of the same logic level as that of a second enable signal ENB2. A fifth enable signal ENB5 is low during a time period from time T21 to time T28 and is high during a time period from time T28 to time T29. Thus, for example, in time periods from time T24 to time T25 and from time T26 to time T27 in which a PWM signal is low and the n-type MOSFET 14 is off, a fifth enable signal ENB5 is low, thereby inhibiting synchronous rectification of the synchronous rectifier circuit 120. For example, in a time period from time T28 to time T29 in which a PWM signal is low and the n-type MOSFET 14 is off, a fifth enable signal ENB5 is high, thereby permitting synchronous rectification of the synchronous rectifier circuit 120.

(2) In the Case where a Frequency of a PWM Signal is Lower than the Predetermined Frequency (from Time T29 to Time T35)

For example, in the case where a PWM signal is changed from a low level to a high level, the n-type MOSFET 14 is turned on, and the n-type MOSFET 12 in an on state is turned off (time T29), if no reverse current I4 is detected, the comparison circuit 22 outputs a high-level comparison signal CMP. At this time, the mask circuit 150 and the backflow prevention circuit 160 output a high-level mask signal MSK and a high-level first enable signal ENB1, respectively. As described above, in a time period from time T29 to time T35, a frequency of a PWM signal is lower than the predetermined frequency, and thus the frequency counter circuit 180 detects a frequency of a PWM signal lower than the predetermined frequency based on a period of a PWM signal equivalent to a time period from time T29 to time T32, for example. The frequency counter circuit 180 outputs a high-level third enable signal ENB3 during a time period from time T29 to time T32, and outputs a low-level third enable signal ENB3 during a time period from time T32 to time T35. A fourth enable signal ENB4 is low during a time period from time T29 to time T30, is high during a time period from time T30 to time T32, and is low during a time period from time T32 to time T35. A fifth enable signal ENB5 is changed into a signal of the same logic level as that of a fourth enable signal ENB4. Thus, for example, during a time period from time T31 to time T32 in which a PWM signal is low and the n-type MOSFET 14 is off, a fifth enable signal ENB5 is high, thereby permitting synchronous rectification of the synchronous rectifier circuit 120. For example, in a time period from time T33 to time T34 in which a PWM signal is low and the n-type MOSFET 14 is off, a fifth enable signal ENB5 is low, thereby inhibiting synchronous rectification of the synchronous rectifier circuit 120.

As described above, the drive coil 300 is connected between the connection point P1 of the n-type MOSFET 11 and the n-type MOSFET 13 connected in series and the connection point P2 of the n-type MOSFET 12 and the n-type MOSFET 14 connected in series. When a drive current I1/I' is supplied to the drive coil 300, the n-type MOSFETs 11 and 14 and the n-type MOSFETs 12 and 13 are turned on/off in a complementary manner. At this time, the n-type MOSFETs 13 and 14 serving as sink transistors are turned on/off according to a PWM signal. For example, in the case where a drive current I1 is supplied to the drive coil 300 in a direction from one end of the drive coil 300 to the other end thereof, and the n-type MOSFET 11 is on, the n-type MOSFET 14 is turned on/off according to a PWM signal. In this case, in the motor drive circuit 100, during a time period during which the n-type MOSFET 14 is off according to a PWM signal, synchronous rectification to turn on the n-type MOSFET 12 in an off state is performed. The sense resistor 21 and the comparison circuit 22 detect a reverse current I4 flowing in a direction from the n-type MOSFET 14 to the n-type MOSFET 11 or in a direction from the n-type MOSFET 13 to the n-type MOSFET 12. For example, when no reverse current I4 is detected, the comparison circuit 22 outputs a high-level comparison signal CMP, and when a reverse current I4 is detected, the comparison circuit 22 outputs a low-level comparison signal CMP. The mask circuit 150 masks, during the first time period, a low-level comparison signal CMP, for example, which is outputted when the comparison circuit 22 detects a reverse current I4, and outputs a mask signal MSK. The backflow prevention circuit 160 outputs a low-level first enable signal ENB1 for inhibiting synchronous rectification, when a low-level mask signal MSK is inputted thereto, for example. When each on-duty period of a PWM signal is shorter than the first time period, the pulse-width measurement circuit 170 outputs a low-level second enable signal ENB2 for inhibiting synchronous rectification, irrespective of an operation of the backflow prevention circuit 160. Thus, for example, when a reverse current I4 occurs in the H-bridge circuit 110, synchronous rectification is inhibited by the backflow prevention circuit 160, thereby being able to prevent occurrence of a reverse current I4. Further, for example, when each on-duty period of a PWM signal is shorter than the first time period, for example, and synchronous rectification cannot be inhibited by the backflow prevention circuit 160, synchronous rectification is inhibited by the pulse-width measurement circuit 170, thereby being able to reliably prevent occurrence of a reverse current I4.

When a frequency of a PWM signal is lower than the predetermined frequency, the frequency counter circuit 180 outputs a low-level third enable signal ENB3 for inhibiting synchronous rectification, irrespective operations of the backflow prevention circuit 160 and the pulse-width measurement circuit 170. Thus, when there is a possibility of generation of a brake current I3 that causes occurrence of a reverse current I4, synchronous rectification is inhibited. Therefore, occurrence of a reverse current I4 is further reliably prevented. Further, since generation of a brake current I3 caused by synchronous rectification can be prevented, a motor rotation speed is prevented from being changed by a brake current I3, thereby being able to provide the motor drive circuit 100 configured to drive a motor in a stable manner.

When the pulse-width measurement circuit 170 outputs a low-level second enable signal ENB2 for inhibiting synchronous rectification, if each on-duty period of a PWM signal becomes longer than the second time period, for example, the pulse-width measurement circuit 170 outputs a high-level second enable signal ENB to permit synchronous rectification. That is, for example, when occurrence of a reverse current I4 can be prevented by the backflow prevention circuit 160, the pulse-width measurement circuit 170 outputs a high-level second enable signal ENB2 to permit synchronous rectification. Thus, by synchronous rectification of the synchronous rectifier circuit 120, heat generation and power consumption of the motor drive circuit 100 when a drive current I1 is supplied to the drive coil 300 can be reduced.

When the frequency counter circuit 180 outputs a low-level third enable signal ENB3 to inhibit synchronous rectification, if a frequency of a PWM signal is higher than the predetermined frequency, the frequency counter circuit 180 outputs a high-level second enable signal ENB2 to permit synchronous rectification. That is, for example, when there is no possibility of generation of a brake current I3 that causes occurrence of a reverse current I4, the frequency counter circuit 180 outputs a high-level third enable signal ENB3 to permit synchronous rectification. Thus, by synchronous rectification of the synchronous rectifier circuit 120, heat generation and power consumption of the motor drive circuit 100 when a drive current I1 is supplied to the drive coil 300 can be reduced.

The above embodiments of the present invention are simply for facilitating the understanding of the present invention and are not in any way to be construed as limiting the present invention. The present invention may variously be changed or altered without departing from its spirit and encompass equivalents thereof.

In an embodiment of the present invention, a description has been given of a configuration in which the motor drive circuit 100 is operated based on logic illustrated in FIG. 6 and FIG. 7, but it is not limited thereto. For example, a configuration may be such that an operation is performed based on logic obtained by inverting the logic illustrated in FIG. 6 and FIG. 7. In such a case, it is assumed, for example, that the AND circuits 31 and 32 are replaced with OR circuits, respectively.

In an embodiment of the present invention, a description has been given of a configuration for preventing occurrence of a reverse current I4/I4' of the motor drive circuit 100 that is configured to supply a drive current I1 to the drive coil 300 of a single-phase motor, but it is not limited thereto. For example, a configuration may be such that occurrence of a reverse current of a motor drive circuit configured to drive three-phase motor is prevented. For example, when the three-phase motor is a motor with a sensor, a configuration may be such that an energization control circuit generates a logic signal based on an FG signal outputted from a hall device that is configured to detect the position of a rotor, and occurrence of a reverse current is prevented by providing the synchronous rectification control circuit 400. Further, for example, when the three-phase motor is a sensorless motor, a configuration may be such that an energization control circuit generates a logic signal based on an FG signal that is generated based on counter-electromotive voltages respectively generated by the three-phase drive coils, and occurrence of a reverse current is prevented by providing the synchronous rectification control circuit 400. Further, when driving a three-phase motor, it is assumed that the energization control circuit 140 illustrated in FIG. 1 is replaced with a circuit configured to generate a logic signal for supplying a drive current to three-phase drive coils (U-phase, V-phase, and V-phase) based on an FG signal.

In an embodiment of the present invention, a description has been given of a configuration in which the H-bridge circuit 110 and the sense resistor 21 are included in the motor drive circuit 100, which is an integrated circuit, for example, but it is not limited thereto. For example, a configuration may be such that the motor drive circuit 100 is provided with terminals for connecting the H-bridge circuit/the sense resistor thereto and an external H-bridge circuit/an external sense resistor are connected to the motor drive circuit 100. That is, at least one of an H-bridge circuit and a sense resistor may be provided externally.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor drive circuit characterized in that when first source-side and second sink-side transistors and second source-side and first sink-side transistors are turned on/off in a complementary manner so as to supply a drive current to a drive coil connected between a first connection point of the first source-side transistor and the first sink-side transistor connected in series and a second connection point of the second source-side transistor and the second sink-side transistor connected in series, the first or the second sink-side transistor is turned on/off according to a PWM signal and synchronous rectification is performed for the motor drive circuit such that the first or the second source-side transistor in an off state is turned on and kept on during a time period during which the first or the second sink-side transistor is off according to the PWM signal, and that the motor drive circuit includes:
a detection circuit configured to detect a reverse current to flow in a direction from the first sink-side transistor to the second source-side transistor or in a direction from the second sink-side transistor to the first source-side transistor;
a disable circuit configured to disable a detection output of the detection circuit during a predetermined time period from a start of detection of the reverse current performed by the detection circuit;
a first inhibit circuit configured to inhibit the synchronous rectification according to a detection output of the detection circuit when the predetermined time period has elapsed from a start of detection of the reverse current performed by the detection circuit;
a second inhibit circuit configured to inhibit the synchronous rectification irrespective of an operation of the first inhibit circuit, when each on-duty period of the PWM signal to turn on the first or the second sink-side transistor is shorter than the predetermined time period; and
a third inhibit circuit configured to inhibit the synchronous rectification irrespective of an operation of the first or the second inhibit circuit, when the PWM signal has a period in which a direction of a current supplied to the drive coil is changed to a direction opposite to a direction thereof at a time of a start of the synchronous rectification.

2. The motor drive circuit according to claim 1, wherein the second inhibit circuit is configured to permit the synchronous rectification, when the synchronous rectification is inhibited by the second inhibit circuit and each on-duty period of the PWM signal is longer than the predetermined time period.

3. The motor drive circuit according to claim 1, wherein the third inhibit circuit is configured to permit the synchronous rectification, when the synchronous rectification is inhibited by the third inhibit circuit and the PWM signal has a period in which a direction of a current supplied to the drive coil is not changed from a direction thereof at a time of a start of the synchronous rectification.

4. A synchronous rectifier control circuit, comprising:
a detection circuit having a first terminal, a second terminal, and an output terminal;
a disable circuit having an input and an output, the input of the disable circuit coupled to the output of the detection circuit;
a first inhibit circuit having a first input, a second input, and an output, the first input of the first inhibit circuit coupled to the output of the disable circuit;
a second inhibit circuit having a first input, a second input, and an output, the first input of the second inhibit circuit coupled to the second input of the first inhibit circuit; and
a third inhibit circuit having a first input, a second input, and an output, the first input of the third inhibit circuit commonly connected to the first input of the second inhibit circuit and to the second input of the first inhibit circuit.

5. The synchronous rectifier control circuit of claim 4 further including:
a first logic gate having a first input, a second input, and an output, the first input of the first logic gate coupled to the output of the second inhibit circuit and the second input of the first logic gate coupled to the output of the third inhibit circuit; and
a second logic gate having a first input, a second input, and an output, the first input of the second logic gate coupled to the output of the first inhibit circuit and the second input of the second logic gate coupled to the output of the first logic gate.

6. The synchronous rectifier control circuit of claim 5, wherein the output of the second logic gate is coupled to a synchronous rectifier circuit.

7. The synchronous rectifier control circuit of claim 5, wherein the commonly connected first input of the third inhibit circuit, first input of the second inhibit circuit, and second input of the first inhibit circuit are connected to a PWM synthesis circuit.

8. The synchronous rectifier control circuit of claim 7, wherein the commonly connected first input of the third inhibit circuit, first input of the second inhibit circuit, and second input of the first inhibit circuit are coupled for receiving a pulse width modulation signal from a microcomputer and the second input of the second inhibit circuit and the second input of the third inhibit circuit are commonly connected for receiving a clock signal from the microcomputer.

9. The synchronous rectifier control circuit of claim 8, wherein the detection circuit comprises a comparison circuit and a resistor, and wherein the comparison circuit has a first terminal, a second terminal, and an output terminal, and the resistor has a first terminal and a second terminal, the first terminal of the resistor coupled to the first terminal of the comparison circuit, the second terminal of the resistor coupled to the second terminal of the comparison circuit, and the output of the comparison circuit is coupled to the input terminal of the disable circuit.

10. A method for controlling synchronous rectification, comprising:
    sensing a current flowing in an H-bridge circuit;
    generating a comparison signal in response to the current flowing in the H-bridge circuit, the comparison signal being at one of a first level or a second level;
    using the comparison signal to control a disable circuit, wherein the disable circuit is configured to operate in an inhibition operating mode in response to the comparison signal being at the first level or a permission operating mode in response to the comparison signal being at the second level;
    in response to operating in the inhibition operating mode:
        generating a masking signal;
        generating a first inhibition signal in response to operating in the inhibition operating mode and a pulse width modulation signal;
        generating a second inhibition signal in response to the pulse width modulation signal and a clock signal;
        using the first inhibition signal and the second inhibition signal to generate a first enable signal; and
        generating a third inhibition signal in response to the pulse width modulation signal and the clock signal.

11. The method of claim 10, wherein generating the second inhibition signal includes generating the second inhibition signal in response to an on-duty period of the pulse width modulation signal.

12. The method of claim 11, wherein generating the second inhibition signal includes measuring the on-duty period of the pulse width modulation signal in response to the clock signal having a higher frequency than a frequency of the pulse width modulation signal.

13. The method of claim 12, further including generating the second inhibition signal for a time from detecting an edge of the pulse width modulation signal changing from a first level to a second level until the edge of the pulse width modulation signal changes from the second level to the first level.

14. The method of claim 11, wherein generating the third inhibition signal includes generating the third inhibition signal in response to a frequency of the pulse width modulation signal.

15. The method of claim 14, wherein generating the third inhibition signal includes generating the third inhibition signal for a time from detecting an edge of the pulse width modulation signal changing from a first level to a second level until a subsequent edge of the pulse width modulation signal changes from the first level to the second level.

16. The method of 10, further including performing synchronous rectification in response to the first enable signal.

17. The method of claim 10, wherein generating the comparison signal in response to the current flowing in the H-bridge circuit includes:
    generating the comparison signal to have the first level in response to a voltage at an input of a comparator being greater than a ground potential; and
    generating the comparison signal to have the second level in response to the voltage at the input of the comparator being less than the ground potential.

* * * * *